(12) United States Patent
Larouche et al.

(10) Patent No.: US 10,557,252 B2
(45) Date of Patent: Feb. 11, 2020

(54) FIRE HYDRANT VALVE AND METHOD FOR CONTROLLING A WATER FLOW IN A FIRE HYDRANT CONDUIT

(71) Applicant: 9309-0983 QUÉBEC INC., Saguenay (CA)

(72) Inventors: Roch Larouche, Saguenay (CA); Maurice Duval, Saguenay (CA); Bernard Gagnon, Saguenay (CA)

(73) Assignee: 9309-0983 QUÉBEC INC., Saguenay, Québec (CA)

( * ) Notice: Subject to any disclaimer, the term of this patent is extended or adjusted under 35 U.S.C. 154(b) by 0 days.

(21) Appl. No.: 15/824,794

(22) Filed: Nov. 28, 2017

(65) Prior Publication Data

US 2018/0148910 A1     May 31, 2018

Related U.S. Application Data

(60) Provisional application No. 62/426,789, filed on Nov. 28, 2016.

(51) Int. Cl.
| | |
|---|---|
| *E03B 7/07* | (2006.01) |
| *F16K 3/24* | (2006.01) |
| *F16K 3/26* | (2006.01) |
| *A62C 35/20* | (2006.01) |

(52) U.S. Cl.
CPC .............. *E03B 7/07* (2013.01); *A62C 35/20* (2013.01); *F16K 3/24* (2013.01); *F16K 3/26* (2013.01); *Y10T 137/5468* (2015.04)

(58) Field of Classification Search
CPC ... E03B 7/07; E03B 9/027; E03B 9/04; E03B 9/14; F16K 3/24; F16K 3/26
See application file for complete search history.

(56) References Cited

U.S. PATENT DOCUMENTS

| | | | | |
|---|---|---|---|---|
| 2,630,823 | A * | 3/1953 | Mueller | E03B 9/14 137/283 |
| 3,599,662 | A * | 8/1971 | Dashner | E03B 9/14 137/257 |
| 3,980,097 | A * | 9/1976 | Ellis | E03B 9/14 137/283 |
| 5,772,182 | A * | 6/1998 | Stambaugh, Sr. | F02C 7/232 137/557 |
| 7,267,136 | B2 | 9/2007 | Fleury, Jr. et al. | |

(Continued)

*Primary Examiner* — Eric Keasel
*Assistant Examiner* — Kevin R Barss
(74) *Attorney, Agent, or Firm* — Merchant & Gould P.C.

(57) ABSTRACT

A flow control valve for a liquid conduit, such as a fire hydrant valve for insertion in a fire hydrant conduit, comprises a fixed valve body mountable inside the liquid conduit, a displaceable valve body, and an actuator assembly operatively engageable with the displaceable valve body. The fixed valve body has a peripheral wall and defines a longitudinal passageway, and at least one upstream port and a downstream port. The displaceable valve body is inserted into the longitudinal passageway of the fixed valve body and is linearly displaceable therealong between a closed configuration and at least one open configuration. The actuator assembly is operable to linearly displace the displaceable valve body along the longitudinal passageway of the fixed valve body between the closed configuration and the at least one open configuration.

21 Claims, 5 Drawing Sheets

(56) References Cited

U.S. PATENT DOCUMENTS

| | | |
|---|---|---|
| 7,575,017 B2 | 8/2009 | Davidson, Sr. et al. |
| 7,775,231 B2 | 8/2010 | Davidson, Sr. et al. |
| 7,798,431 B2 | 9/2010 | Eader |
| 8,186,648 B2 | 5/2012 | Sakai et al. |
| 8,444,112 B2 | 5/2013 | Cravener et al. |
| 8,490,638 B2 | 7/2013 | Fitzpatrick |
| 8,997,777 B2 * | 4/2015 | Montague ............... A62C 35/20 137/281 |

* cited by examiner

FIRE HYDRANT VALVE AND METHOD FOR CONTROLLING A WATER FLOW IN A FIRE HYDRANT CONDUIT

CROSS-REFERENCE TO RELATED APPLICATIONS

This application claims priority under 35USC § 119(e) of US provisional patent application 62/426,789 filed on Nov. 28, 2016, the specification of which is hereby incorporated by reference.

TECHNICAL FIELD OF THE INVENTION

The technical field relates to a fire hydrant valve insertable in a fire hydrant conduit and to a method for controlling a water flow in a fire hydrant conduit.

BACKGROUND

The present-day fire hydrant valves are composed of a flap removably engaged in a valve seat, wherein the flap is maintained in closed position with a valve stem extending from the aboveground section of the fire hydrant conduit. In a usual configuration, the valve seat is threadable with the body section of the elbow of the fire hydrant conduit. To disengage the flap from the seat and to open the valve, an operator has to apply a thrust downwardly on the stem via an operating nut located in the head of the fire hydrant conduit. Thus, the stem must be made of a rigid material and must present a strong section since a significant pressure is applied on it when opening the valve.

Additionally, the present-day fire hydrant valves are composed of an important number of parts rendering the maintenance operations costly and time-consuming. Moreover, such a great number of parts make the present-day fire hydrant valves vulnerable to frost damage in cold climate regions. Additionally, the operating nut and other parts extending aboveground are more subject to frost than the buried parts of the valve. Thus, the operation and the maintenance of the fire hydrant valves, and also of the fire hydrant conduits, can be grueling for some regions, especially during cold weather, for all these reasons.

Water hammer phenomena can also be observed occasionally in present-day fire hydrant valves since a great amount of slack or allowance is induced in the fire hydrant conduits by the various combined components working under high stress.

BRIEF SUMMARY OF THE INVENTION

It is therefore an aim of the present invention to address the above mentioned issues.

According to a general aspect, there is provided a fire hydrant valve insertable in a fire hydrant conduit defined by a conduit peripheral wall. The fire hydrant valve comprises: a fixed valve body having a peripheral wall and defining a longitudinal passageway, and at least one upstream port and a downstream port in fluid communication with the longitudinal passageway; a displaceable valve body having a peripheral wall and defining a longitudinal passageway and being complimentary inserted into the longitudinal passageway of the fixed valve body and being linearly displaceable into the longitudinal passageway of the fixed valve body between a closed configuration, preventing water from flowing into the longitudinal passageways through the at least one upstream port, and at least one open configuration allowing water to flow into the longitudinal passageways through the at least one upstream port; and an actuator assembly operatively engageable with the displaceable valve body, the actuator assembly being operable to linearly displace the displaceable valve body along the longitudinal passageway of the fixed valve body between the closed configuration and the at least one open configuration.

In an embodiment, the fixed valve body comprises an upstream end wall.

In an embodiment, the longitudinal passageway of the fixed valve body is open at a downstream end.

In an embodiment, the peripheral wall of the displaceable valve body is substantially annular and concentric with the peripheral wall of the fixed valve body.

In an embodiment, the actuator assembly comprises a shaft including a threaded section and extending into the longitudinal passageways with a first end secured to the upstream end wall of the fixed valve body.

In an embodiment, the displaceable valve body comprises a central member further comprising an internally threaded channel, the channel being operatively engaged with the threaded section of the shaft, and the shaft being engageable into rotation to displace linearly the displaceable valve body along the shaft into the longitudinal passageways.

In an embodiment, the peripheral wall of the fixed valve body comprises a drainage aperture extending therethrough and an upstream outer peripheral seal secured to and circumscribing the peripheral wall below the drainage aperture and a downstream outer peripheral seal secured to and circumscribing the peripheral wall above the drainage aperture.

In an embodiment, the peripheral wall of the displaceable valve body comprises an upstream outer peripheral seal and a downstream outer peripheral seal secured to and circumscribing the peripheral wall, wherein when the fire hydrant valve is configured in a closed configuration, the upstream outer peripheral seal extends below the at least one upstream port and the downstream outer peripheral seal extends above the at least one upstream port.

According to another general aspect, there is provided a method for controlling a water flow in the fire hydrant conduit in which the fire hydrant valve is mounted. The method comprises: maintaining the fire hydrant valve in the closed configuration; and actuating the actuator assembly to linearly displace the displaceable valve body into the longitudinal passageway of the fixed valve body from the closed configuration to the at least one open configuration, thereby opening the at least one upstream port and allowing water to flow into the longitudinal passageways from the at least one upstream port to the downstream port.

In an embodiment, maintaining the fire hydrant valve in the closed configuration comprises closing the at least one upstream port by aligning the peripheral wall of the displaceable valve body therewith.

According to a general aspect, there is provided a fire hydrant valve insertable in a fire hydrant conduit defined by a conduit peripheral wall. The fire hydrant valve comprises: a fixed valve body having a peripheral wall and defining a longitudinal passageway, and having at least one upstream port and a downstream port in fluid communication with the longitudinal passageway; a displaceable valve body having a peripheral wall and defining a longitudinal passageway and being inserted into the longitudinal passageway of the fixed valve body and being linearly displaceable into the longitudinal passageway of the fixed valve body between a closed configuration, preventing water from flowing into the longitudinal passageways through the at least one upstream port, and at least one open configuration allowing water to flow into the longitudinal passageways through the at least one upstream port; and a valve actuator assembly operatively engageable with the displaceable valve body, the valve actuator assembly being operable to linearly displace the displaceable valve body along the longitudinal passageway of the fixed valve body between the closed configuration and the at least one open configuration.

In an embodiment, the at least one upstream port comprises a plurality of upstream ports uniformly distributed about the peripheral wall of the fixed valve body, each one of the upstream ports having substantially a same surface area.

In an embodiment, the peripheral wall comprises an upstream edge and the fixed valve body comprises an upstream end wall extending from the upstream edge of the peripheral wall and closing the longitudinal passageway of the fixed valve body at an upstream end thereof. The at least one upstream port can be adjacent to the upstream end wall. The fire hydrant valve can be configurable in a fully open configuration wherein the upstream edge of the peripheral wall of the displaceable valve body is located downstream of the upstream ports. In the closed configuration, the upstream edge of the peripheral wall of the displaceable valve body can located upstream of the upstream ports.

In an embodiment, the longitudinal passageway of the fixed valve body is open at a downstream end. The peripheral wall can comprise a downstream edge and the downstream edge can define the downstream port of the fixed valve body. The downstream port can be substantially unobstructed.

In an embodiment, an inner perimeter of the fixed valve body substantially conforms to an outer perimeter of the displaceable valve body.

In an embodiment, the peripheral wall of the displaceable valve body is substantially annular and concentric with the peripheral wall of the fixed valve body.

In an embodiment, the valve actuator assembly comprises a linear actuator. The valve actuator assembly can comprise a shaft including a threaded section and extending into the longitudinal passageways with an upstream end secured to an upstream end wall of the fixed valve body. The displaceable valve body can comprise an actuator support with a central member with an internally threaded channel, the internally threaded channel being operatively engaged with the threaded section of the shaft, and the shaft being engageable into rotation to displace linearly the displaceable valve body along the shaft and into the longitudinal passageway of the fixed valve body. The actuator support can further comprise support arms connecting the central member with the peripheral wall of the displaceable valve body. The shaft can be rotatable.

In an embodiment, the peripheral wall of the fixed valve body comprises a drainage aperture extending therethrough and the fixed valve body further comprises an upstream outer peripheral seal secured to and circumscribing the peripheral wall upstream the drainage aperture and a downstream outer peripheral seal secured to and circumscribing the peripheral wall of the fixed valve body, downstream the drainage aperture. The drainage aperture can be uncovered by the peripheral wall of the displaceable valve body in the closed configuration. The peripheral wall of the fixed valve body can comprise a peripheral inner face and the fixed valve body can comprise an inner peripheral seal mounted to the peripheral inner face of the fixed valve body, below the drainage aperture and downstream the at least one upstream port, the inner peripheral seal circumscribing the peripheral wall.

In an embodiment, the displaceable valve body comprises an upstream outer peripheral seal and a downstream outer peripheral seal secured to and circumscribing the peripheral wall, wherein when the fire hydrant valve is configured in a closed configuration, the upstream outer peripheral seal extends upstream the at least one upstream port and the downstream outer peripheral seal extends downstream the at least one upstream port.

In an embodiment, the fixed valve body is mountable inside the fire hydrant conduit and abuts against the conduit peripheral wall in a single configuration.

According to another general aspect, there is provided a method for controlling a water flow in the fire hydrant conduit in which the fire hydrant valve, described above, is mounted. The method comprises: maintaining the fire hydrant valve in the closed configuration; and actuating the actuator assembly to linearly displace the displaceable valve body into the longitudinal passageway of the fixed valve body from the closed configuration to the at least one open configuration, thereby exposing the at least one upstream port and allowing water to flow into the longitudinal passageways from the at least one upstream port to the downstream port.

In an embodiment, maintaining the fire hydrant valve in the closed configuration comprises closing the at least one upstream port by aligning the peripheral wall of the displaceable valve body therewith.

According to still another general aspect, there is provided a flow control valve insertable in a liquid conduit defined by a conduit peripheral wall. The valve comprises: a fixed valve body having a peripheral wall and defining a longitudinal passageway, and having at least one upstream port and a downstream port in fluid communication with the longitudinal passageway; a displaceable valve body having a peripheral wall and defining a longitudinal passageway and being inserted into the longitudinal passageway of the fixed valve body and being linearly displaceable into the longitudinal passageway of the fixed valve body between a closed configuration, preventing water from flowing into the longitudinal passageways through the at least one upstream port, and at least one open configuration allowing water to flow into the longitudinal passageways through the at least one upstream port; and a valve actuator assembly operatively engageable with the displaceable valve body, the valve actuator assembly being operable to linearly displace the displaceable valve body along the longitudinal passageway of the fixed valve body between the closed configuration and the at least one open configuration.

In an embodiment, the at least one upstream port comprises a plurality of upstream ports uniformly distributed about the peripheral wall of the fixed valve body, each one of the upstream ports having substantially a same surface area.

In an embodiment, the peripheral wall comprises an upstream edge and the fixed valve body comprises an upstream end wall extending from the upstream edge of the peripheral wall and closing the longitudinal passageway of the fixed valve body at an upstream end thereof. The at least one upstream port can be adjacent to the upstream end wall. The valve can be configurable in a fully open configuration wherein the upstream edge of the peripheral wall of the displaceable valve body is located downstream of the upstream ports. In the closed configuration, the upstream edge of the peripheral wall of the displaceable valve body can located upstream of the upstream ports.

In an embodiment, the longitudinal passageway of the fixed valve body is open at a downstream end. The peripheral wall can comprise a downstream edge and the downstream edge can define the downstream port of the fixed valve body. The downstream port can be substantially unobstructed.

In an embodiment, an inner perimeter of the fixed valve body substantially conforms to an outer perimeter of the displaceable valve body.

In an embodiment, the peripheral wall of the displaceable valve body is substantially annular and concentric with the peripheral wall of the fixed valve body.

In an embodiment, the valve actuator assembly comprises a linear actuator. The valve actuator assembly can comprise a shaft including a threaded section and extending into the longitudinal passageways with an upstream end secured to an upstream end wall of the fixed valve body. The displaceable valve body can comprise an actuator support with a central member with an internally threaded channel, the internally threaded channel being operatively engaged with the threaded section of the shaft, and the shaft being engageable into rotation to displace linearly the displaceable valve body along the shaft and into the longitudinal passageway of the fixed valve body. The actuator support can further comprise support arms connecting the central member with the peripheral wall of the displaceable valve body. The shaft can be rotatable.

In an embodiment, the peripheral wall of the fixed valve body comprises a drainage aperture extending therethrough and the fixed valve body further comprises an upstream outer peripheral seal secured to and circumscribing the peripheral wall upstream the drainage aperture and a downstream outer peripheral seal secured to and circumscribing the peripheral wall of the fixed valve body, downstream the drainage aperture. The drainage aperture can be uncovered by the peripheral wall of the displaceable valve body in the closed configuration. The peripheral wall of the fixed valve body can comprise a peripheral inner face and the fixed valve body can comprise an inner peripheral seal mounted to the peripheral inner face of the fixed valve body, below the drainage aperture and downstream the at least one upstream port, the inner peripheral seal circumscribing the peripheral wall.

In an embodiment, the displaceable valve body comprises an upstream outer peripheral seal and a downstream outer peripheral seal secured to and circumscribing the peripheral wall, wherein when the valve is configured in a closed configuration, the upstream outer peripheral seal extends upstream the at least one upstream port and the downstream outer peripheral seal extends downstream the at least one upstream port.

In an embodiment, the fixed valve body is mountable inside the liquid conduit and abuts against the conduit peripheral wall in a single configuration.

According to a further general aspect, there is provided a method for controlling a water flow in the liquid conduit in which the flow control valve as described above is mounted. The method comprises: maintaining the flow control valve in the closed configuration; and actuating the actuator assembly to linearly displace the displaceable valve body into the longitudinal passageway of the fixed valve body from the closed configuration to the at least one open configuration, thereby exposing the at least one upstream port and allowing water to flow into the longitudinal passageways from the at least one upstream port to the downstream port.

In an embodiment, maintaining the flow control valve in the closed configuration comprises closing the at least one upstream port by aligning the peripheral wall of the displaceable valve body therewith.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the fire hydrant valve and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the fire hydrant valve, as will be briefly explained herein and as can be easily inferred herefrom by a person skilled in the art.

Moreover, it will be appreciated that positional descriptions such as "above", "below", "forward", "rearward" "left", "right" and the like should, unless otherwise indicated, be taken in the context of the figures and correspond to the position and orientation of the fire hydrant valve and corresponding parts when inserted in a fire hydrant conduit. Positional descriptions should not be considered limiting. Upstream refers to before or near an inlet of the fire hydrant valve and downstream refers to after or near an outlet of the fire hydrant valve with respect to a normal flow of water in the fire hydrant valve.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Even tough, all the embodiments described below are with respect to a fire hydrant valve, it is appreciated that the flow control valve described and claimed can be used in any other suitable liquid conduit, without being limitative to a water conduit.

In reference to FIGS. 1, 2 and 3, an embodiment of a fire hydrant valve 22 will be described. The fire hydrant valve 22 is insertable in a fire hydrant conduit 20 (FIG. 5) and is selectively configurable between a closed configuration preventing water (not shown) to flow through the fire hydrant valve 22 and a plurality of open configurations wherein the fire hydrant valve 22 allows water to flow therethrough. As will be described in more details below, when inserted in the fire hydrant conduit 20, the fire hydrant valve 22 divides the fire hydrant conduit 20 into an upstream section 25, i.e. a section of the fire hydrant conduit 20 extending upstream the fire hydrant valve 22, and a downstream section 27, i.e. a section of the fire hydrant conduit 20 extending downstream the fire hydrant valve 22. The upstream section 25 of the fire hydrant conduit 20 extends from an outlet of the fire hydrant valve 22 while the downstream section 27 extends to an inlet of the fire hydrant valve 22, i.e. to upstream ports of the fire hydrant valve 22 as will be described in more details below, with respect to a normal flow of water in the fire hydrant valve 22.

Figure 1:
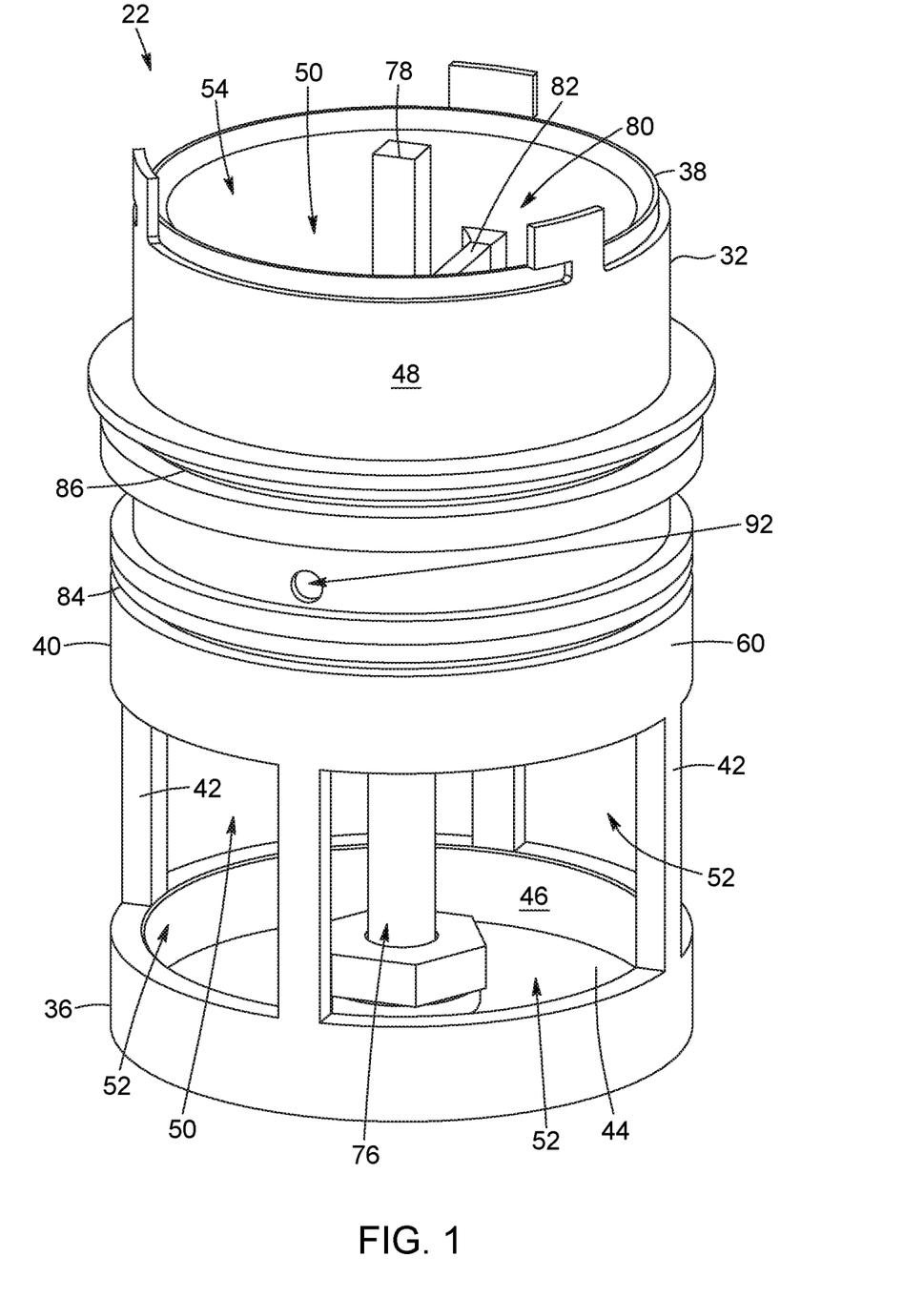
FIG. 1 is a perspective view of the fire hydrant valve in accordance with an embodiment.

Referring now to FIG. 1, the fire hydrant valve 22 comprises a fixed valve body 32. In the embodiment shown, the fixed valve body 32 has a substantially tubular shape corresponding to a shape of a conduit peripheral wall 28 (FIG. 5) of the fire hydrant conduit 20, as it will be described in further details below. The fixed valve body 32 comprises a peripheral wall 40 and an upstream end wall 44. The peripheral wall defines a longitudinal passageway 50 with an upstream end 36 and a downstream end 38. The longitudinal passageway 50 allows a flow of water therealong, inside the fixed valve body 32. The upstream end wall 44 closes the longitudinal passageway 50 at the upstream end 36. At the downstream end 38, the fixed valve body 32 is open, i.e. the fixed valve body 32 is free of downstream end wall, thereby defining a downstream port 54 of the fire hydrant valve 22. In the embodiment shown, the upstream end wall 44 is single piece with the peripheral wall 40.

In an embodiment, the valve body 32 of the fire hydrant valve 22 is fixed since it is engaged inside the fire hydrant conduit 20 in one configuration, i.e. the configuration of the valve body 32 inside the fire hydrant conduit 20 is not modified when the configuration of the fire hydrant valve 22 is modified between one of the at least partially open configuration and a closed configuration, as will be described in more detail below. In other words, the fixed valve body 32 is mounted in a single configuration with respect to the fire hydrant conduit 20.

In an embodiment, an outer perimeter of the valve body 32 substantially corresponds to an inner perimeter of the fire hydrant conduit 20. Furthermore, in an embodiment, an external diameter of the valve body 32 substantially corresponds to an inner diameter of the fire hydrant conduit 20 in a manner such that water is prevented to flow between an inner wall surface of the fire hydrant conduit 20, defining its inner diameter and its inner perimeter, and an outer wall surface of the valve body 32, defining its external diameter and its outer perimeter. In an embodiment, at least one of the valve body 32, on its outer wall surface, and the fire hydrant conduit 20, on its inner wall surface, includes one or more peripheral seals to further prevent wall flow between the inner wall surface of the fire hydrant conduit 20 and the outer wall surface of the valve body 32, as will be described in more details below.

It is appreciated that the shape and the configuration of the valve body 32 can vary from the embodiment shown.

The peripheral wall 40 of the fixed valve body 32 comprises a peripheral outer face 48 and a peripheral inner face 46, wherein the peripheral outer face 48 is configured to be substantially adjacent to, and almost abut, an inner face 30 (FIG. 5) of the peripheral wall 28 of the fire hydrant conduit 20 to prevent water flow inbetween, as it will be described in more details below.

In the embodiment shown, the fixed valve body 32 comprises a plurality of upstream ports 52, provided close to the upstream end 36. In the embodiment shown, the upstream ports 52 circumscribe the peripheral wall 40 in a substantially equally spaced-apart arrangement. The upstream ports 52 are throughout apertures defined in the peripheral wall 40 allowing water to flow from the upstream section 25 of the fire hydrant conduit 20 into the longitudinal passageway 50 of the fixed valve body 32 in an at least partially open configuration thereof. A plurality of peripheral wall columns 42 extend between the spaced-apart upstream ports 52 and connect a section of the peripheral wall 40 adjacent to the upstream end wall 44 to an intermediate section 60 of the peripheral wall 40.

It is appreciated that the number, the shape and the configuration of upstream ports 52 can vary from the embodiment shown. In the embodiment shown, the upstream ports 52 are wider than the peripheral wall columns 42 extending inbetween.

In an embodiment, the surface area of each one of the upstream ports 52 is substantially identical and the upstream ports 52 are substantially evenly peripherally about (or around) the peripheral wall 40 in a manner such that the water pressure is substantially evenly distributed, as will be described in more details below.

In an alternative embodiment (not shown), the downstream end 38 of the longitudinal passageway 50 can be partially occluded by a downstream end wall, with one or a plurality of apertures being defined in the downstream end wall defining therethrough one or a plurality of downstream port(s). In still another alternative embodiment, the downstream port(s) can also be defined in a downstream section of the peripheral wall 40, wherein the downstream port(s) is or are spaced-apart from the peripheral wall 28 of the fire hydrant conduit 20 (FIG. 5) when the fire hydrant valve 22 is inserted therein, as it will be described in further details below.

Figure 2:
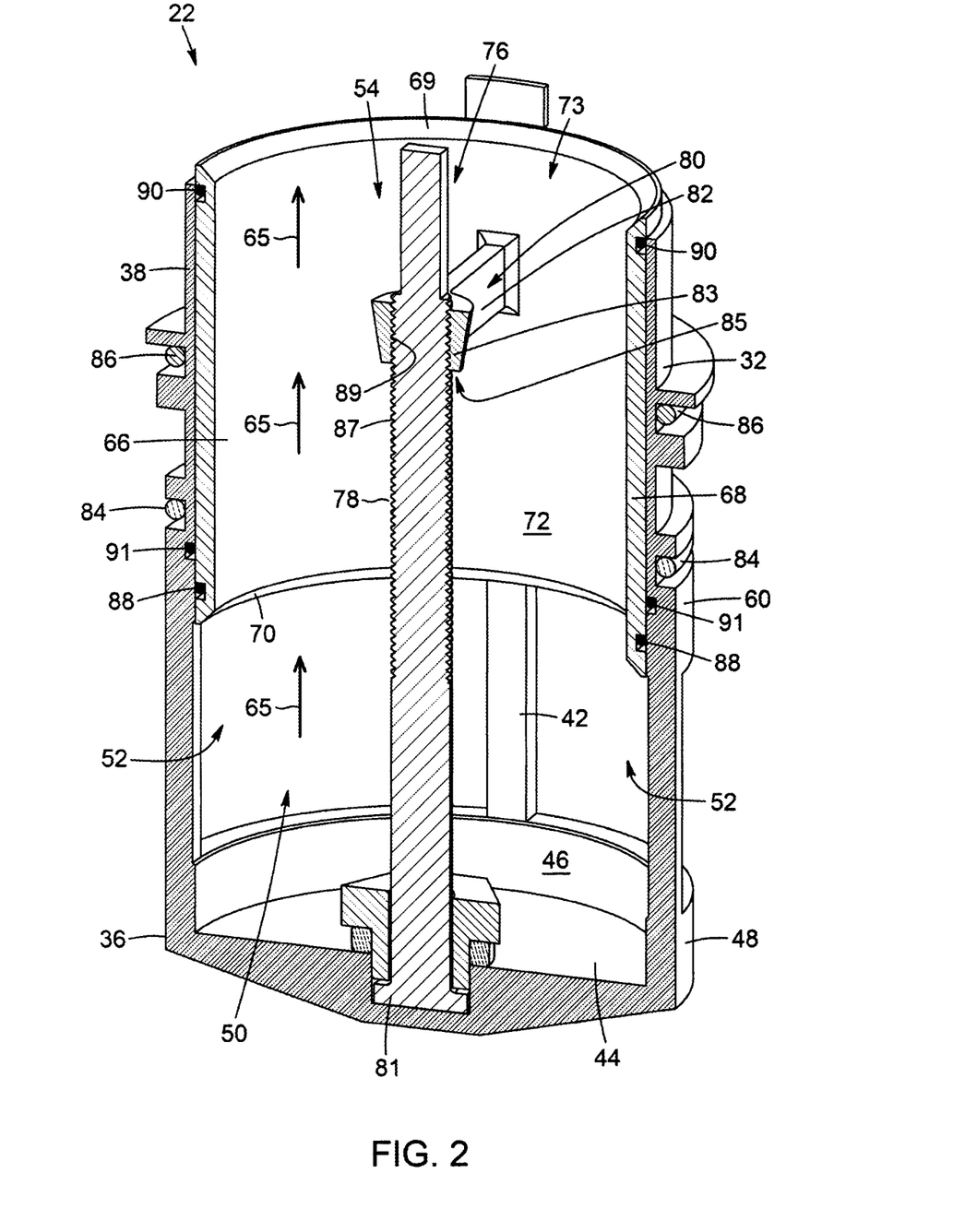
FIG. 2 is a cross-section view of the fire hydrant valve shown in FIG. 1 wherein the fire hydrant valve is configured in a fully open configuration.
Figure 3:
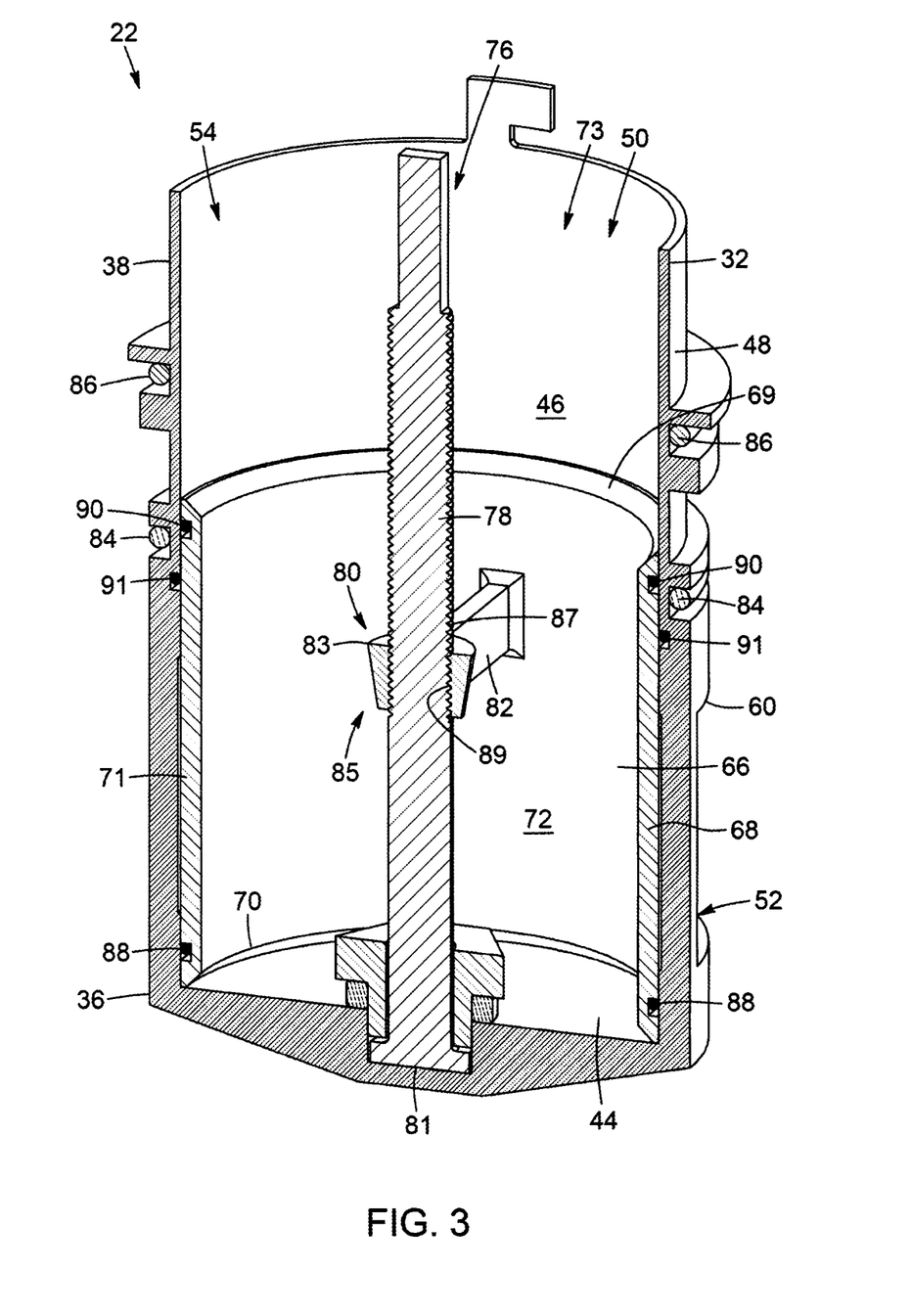
FIG. 3 is a cross-section view of the fire hydrant valve shown in FIG. 1 wherein the fire hydrant valve is configured in a closed configuration.

Referring now to FIGS. 2 and 3, the fixed hydrant valve 22 further comprises a displaceable valve body 66 inserted into the longitudinal passageway 50 of the fixed valve body 32 and linearly displaceable therealong (i.e. translatable). Similarly as for the fixed valve body 32, the displaceable valve body 66 is substantially cylindrical in shape and comprises a peripheral wall 68 with a peripheral outer face 71 and a peripheral inner face 72. The peripheral wall 68 defines a longitudinal passageway 73. When the displaceable valve body 66 is inserted into the longitudinal passageway 50 of the fixed valve body 32, the longitudinal passageway 73 is concentric and is encompassed within the longitudinal passageway 50. In the embodiment shown, the peripheral wall 68 of the displaceable valve body 66 is substantially annular and concentric with the peripheral wall 40 of the fixed valve body 32, with the peripheral outer face 71 of the displaceable valve body 66 being substantially contiguous to the peripheral inner face 46 of the fixed valve body 32. The displaceable valve body 66 is opened at both ends thereby allowing water to flow therein, into the longitudinal passageways 50, 73, in the direction of arrow 65.

In an embodiment, an outer perimeter of the displaceable valve body 66 substantially corresponds to an inner perimeter of the fixed valve body 32. Furthermore, in an embodiment, an external diameter of the displaceable valve body 66 substantially corresponds to an inner diameter of the fixed valve body 32 in a manner such that water is prevented to flow between the peripheral inner face 46 of the fixed valve body 32, defining its inner diameter and its inner perimeter, and the peripheral outer face 71 of the displaceable valve body 66, defining its external diameter and its outer perimeter. In an embodiment, at least one of the displaceable valve body 66, on its outer wall surface (or peripheral outer face 71), and the fixed valve body 32, on its inner wall surface (or peripheral inner face 46), includes one or more peripheral seals to further prevent wall flow between the inner wall surface of the fixed valve body 32 and the outer wall surface of the displaceable valve body 66, as will be described in more details below.

It is appreciated that the shape and the configuration of the displaceable valve body 66 can vary from the embodiment shown. In an embodiment, it substantially conforms to the shape of the peripheral inner face 46 of the fixed valve body 32.

The displaceable valve body 66 further comprises an actuator support 80 extending in the longitudinal passageway 73 from the peripheral inner face 72 of the peripheral wall 68. More particularly, in the embodiment shown, the actuator support 80 comprises two arms 82 (FIG. 4), extending radially in the passageway 73, and a central member 83 having an internally threaded channel 85 defined therein. The support arms 82 connect the central member 83 to the peripheral wall 68 and support same centrally inside the passageway 73. The purpose of the actuator support 80 will be described in more details below. It is appreciated that the shape and the configuration of the actuator support 80 can vary from the embodiment shown.

As mentioned above, the fire hydrant valve 22 is selectively configurable between a closed configuration and a plurality of open configurations. The configuration of the fire hydrant valve 22 is modified by displacing the displaceable valve body 66 linearly into the longitudinal passageway 50 and by configuring the displaceable valve body 66 in a plurality of configurations with respect to the fixed valve body 32.

More particularly, in FIG. 2, there is shown the fire hydrant valve 22 in a fully open configuration, wherein the displaceable valve body 66 is positioned above the upstream ports 52 of the fixed valve body 32, thereby allowing water to flow into the longitudinal passageways 50, 73 through the upstream ports 52, in the direction of arrow 65, between the upstream and downstream sections 25, 27 of the fire hydrant conduit 20. In the embodiment shown in FIG. 2, an upstream edge 70 of the peripheral wall 68 of the displaceable valve body 66 is located above the upstream ports 52, i.e. downstream the upstream ports 52, thereby maximizing an open surface of the upstream ports 52. It is appreciated that the fire hydrant valve 22 can be configured in a plurality of open configurations wherein the upstream ports 52 are partially closed by the peripheral wall 68 of the displaceable valve body 66. Thus, a water flow (not shown) flowing through the fire hydrant valve 22 is scalable by modifying a position of the displaceable valve body 66 in the longitudinal passageway 50 and thus, the open surface of the upstream ports 52.

In the partially open configurations, the displaceable valve body 66 is positioned in a manner such that the upstream edge 70 of the peripheral wall 68 intersects (or is aligned with) the upstream ports 52, thereby providing a lower water flow inside the longitudinal passageways 50, 73.

In an alternative embodiment (not shown), in the fully open configuration, the displaceable valve body 66 can be positioned in a manner such that the upstream edge 70 of the peripheral wall 68 intersects (or is aligned with) the upstream ports 52. In other words, the displaceable valve body 66 can be configured in a manner such that the displaceable valve body 66 can be prevented from reaching a configuration wherein the upstream edge 70 of the peripheral wall 68 is located above the upstream ports 52.

Turning now to FIG. 3, there is shown the fire hydrant valve 22 in the closed configuration, wherein the displaceable valve body 66 is aligned with the upstream ports 52 of the fixed valve body 32 and its peripheral wall 68 closes same, and thereby preventing water to flow into the longitudinal passageways 50, 73 through the upstream ports 52. To close the upstream ports 52, the upstream edge 70 of the peripheral wall 68 is located below (upstream) the upstream ports 52, close to the upstream end wall 44 of the fixed valve body 32. Thus, in the closed configuration, the upstream ports 52 are occluded by the peripheral wall 68 of the displaceable valve body 66. In the embodiment shown in FIG. 3, the upstream edge 70 of the peripheral wall 68 of the displaceable valve body 66 is substantially contiguous to, and, in an embodiment, abuts the upstream end wall 44 of the fixed valve body 32.

To configure the fire hydrant valve 22 between the closed configuration (FIG. 3) and the plurality of open configurations, the displaceable valve body 66 is linearly displaceable along the longitudinal passageway 50. More particularly, the displaceable valve body 66 is linearly displaced through a valve actuator assembly 76. In an embodiment, the actuator assembly 76 includes a linear actuator.

Figure 4:
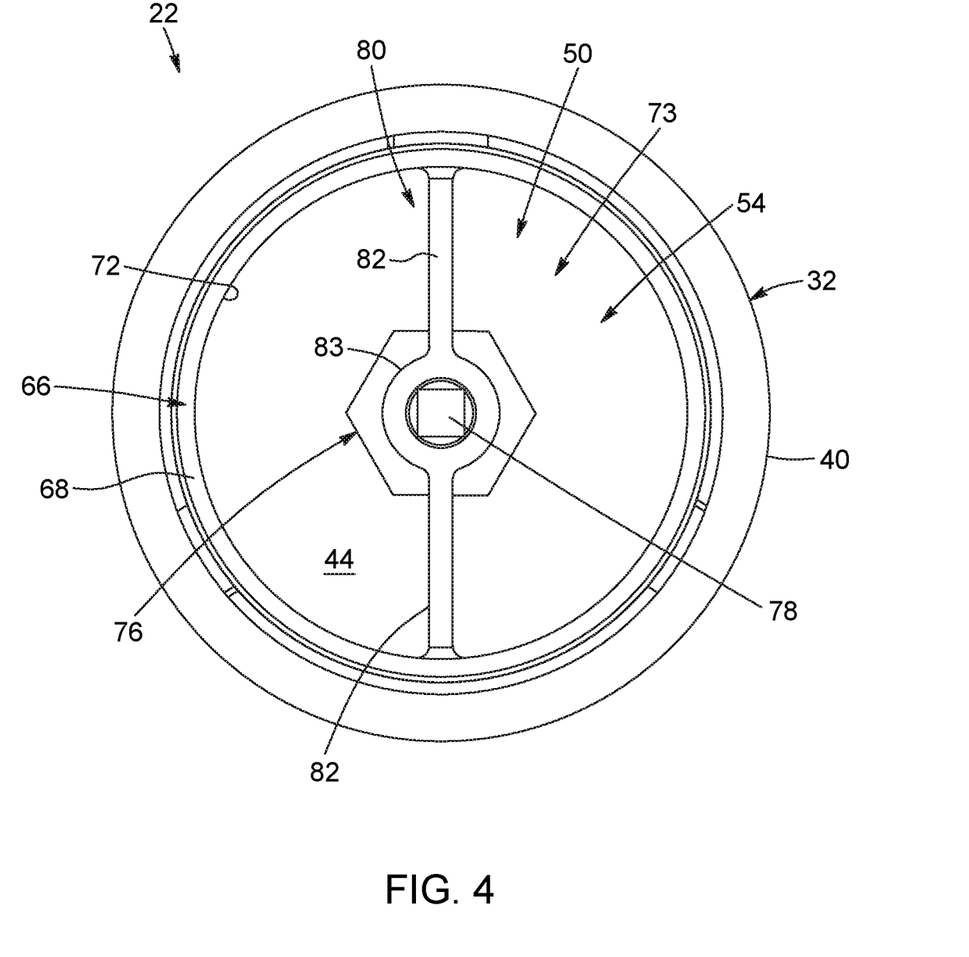
FIG. 4 is a top plan view of the fire hydrant valve shown in FIG. 1.

Referring now to FIGS. 2, 3 and 4, there is shown an embodiment of the actuator assembly 76. The actuator assembly 76 comprises a shaft 78 which extends vertically and centrally into the longitudinal passageways 50, 73. In the embodiment shown, the shaft 78 comprises a threaded section 87 therealong and has an upstream end 81 rotatably mounted to or abutted against the upstream end wall 44. The shaft 78 extends into the internally threaded channel 85 of the central member 83 of the actuator support 80 with its threaded section 87 engaged with the threads 89 of the channel 85 of the central member 83. Upon rotation of the shaft 78 of the actuator assembly 76, the displaceable valve body 66 is displaced linearly along the shaft 78 and within the longitudinal passageways 50, 73.

In the embodiment shown, a cross-section of the shaft 78 varies along its length. In the embodiment shown, the shaft 78 is substantially cylindrical in the section extending from and below the actuator support 80 and has a rectangular cross-section in the section extending above the actuator support 80.

In an alternative embodiment, the shaft 78 can be replaced or combined with other manipulators. For instance and without being limitative, the shaft 78 can be replaced or combined with a hydraulic cylinder characterized by a relatively small cross-section. Moreover, the actuation of the hydraulic cylinder to configure the fire hydrant valve 22 from the closed configuration to one of the plurality of open configurations in response to an over-pressurization upstream in the fire hydrant conduit 20 or in a network can contribute to prevent water hammer phenomena occurring in the network.

Referring now to FIG. 1, the peripheral wall 40 of the fixed valve body 32 is provided with a drainage aperture 92 extending therethrough. In the embodiment shown, the drainage aperture 92 is defined above the upstream ports 52 in the intermediate section 60 of the peripheral wall 40, and between an upstream outer peripheral seal 84 and a downstream outer peripheral seal 86, as it will be described in further details below. In the closed configuration, the drainage aperture 92 evacuates by gravity, causing an overflow of water contained within the fire hydrant valve 22 out of the longitudinal passageways 50, 73 into the fire hydrant conduit 20.

In the embodiment shown, the upstream outer peripheral seal 84 and the downstream outer peripheral seal 86 are mounted to the peripheral outer face 48 of the peripheral wall 40 of the fixed valve body 32 and, amongst others, prevent the overflowed water to re-enter the longitudinal passageways 50, 73 through respectively the upstream ports 52 and the downstream port 54, as it will be described in further details below. The upstream outer peripheral seal 84 and the downstream outer peripheral seal 86 are configured to abut against the inner surface of the fire hydrant conduit 20. In the embodiment shown, the drainage aperture 92 is circular. In an alternative embodiment, the drainage aperture 92 can have a different shape, and can be defined at a different location of the peripheral wall 40 of the fixed valve body 32. Furthermore, the fixed valve body 32 can include a plurality of drainage apertures 92 defined in its peripheral wall 40. Additionally, when the fire hydrant valve 22 is in the closed configuration, the drainage aperture 92 can substantially minimize potential inconveniences caused by the freezing of at least a portion of the water contained in the longitudinal passageways 50, 73, during cold weather episodes in cold climate regions, by evacuating the overflow of the water contained within the fire hydrant valve 22 out of the longitudinal passageways 50, 73.

In the embodiment shown, the drainage aperture 92 is exposed inside the longitudinal passageway 50 in the closed configuration of the fire hydrant valve 22, i.e. it is uncovered by the peripheral wall 68 of the displaceable valve body 66 with a downstream edge 69 of the peripheral wall 68 of the displaceable valve body 66 extending below (or upstream) the drainage aperture 92. Furthermore, in the embodiment shown, the drainage aperture 92 is covered by the peripheral wall 68 of the displaceable valve body 66 in the fully open configuration of the fire hydrant valve 22. Thus, water contained in the longitudinal passageway 73 can only exit through the drainage aperture 92 in the closed configuration of the fire hydrant valve 22 or a minimally open configuration wherein the downstream edge 69 of the peripheral wall 68 of the displaceable valve body 66 extends below (or upstream) the drainage aperture 92.

Referring now to FIGS. 2, 3 and 4 and as mentioned above, the fire hydrant valve 22 further comprises a plurality of seals 84, 86, 88, 90, 91 configured to prevent water leaks between the inner face 30 of the fire hydrant conduit 20 (FIG. 5) and the fixed valve body 32 and between the fixed valve body 32 and the displaceable valve body 66. The seals 84, 86, 88, 90, 91 are secured to a respective one of the peripheral walls 40, 68 of the fixed valve body 32 and the displaceable valve body 66. In an embodiment, the seals 84, 86, 88, 90, 91 comprise a resilient deformable material, such as rubber, or the like. In an embodiment, the seals 84, 86, 88, 90, 91 are annular in shape. In alternative embodiments, other sealing means can be used to prevent fluid communication between substantially contiguous members of the fire hydrant valve 22 and/or the fire hydrant conduit 20 (FIG. 5), such as elastomers, or the like. In an embodiment, each one of the seals 84, 86, 88, 90, 91 can include one or more seal members.

More particularly, to ensure a watertight connection between the inner face 30 of the fire hydrant conduit 20 and the fixed valve body 32, two seals 84, 86 are mounted to the peripheral outer face 48 of the peripheral wall 40 of the fixed valve body 32: the upstream outer peripheral seal 84 and the downstream outer peripheral seal 86. The upstream seal 84 circumscribes the peripheral wall 40 below (upstream) the drainage aperture 92. It prevents water contained in the upstream section 25 of the fire hydrant conduit 20 from flowing between the inner face 30 of the fire hydrant conduit 20 and the peripheral outer face 48 of the fixed valve body 32. The downstream seal 86 circumscribes the peripheral wall 40, above (downstream) the drainage aperture 92. It prevents water flowing through the fire hydrant valve 22 and into the downstream section 27 of the fire hydrant conduit 20 to flow between the inner face 30 of the fire hydrant conduit 20 and the peripheral outer face 48 of the fixed valve body 32, thereby returning into the upstream section 25 of the fire hydrant conduit 20. In alternative embodiments, the fixed valve body 32 can comprise more or less peripheral seals and the seals 84, 86 can be mounted to a different location on the peripheral wall 40.

More particularly, to ensure a watertight connection between the peripheral inner face 46 of the fixed valve body 32 and the peripheral outer face 71 of the displaceable valve body 66, two seals 88, 90 are mounted to the peripheral outer face 71 of the peripheral wall 68 of the displaceable valve body 66: an upstream outer peripheral seal 88 and a downstream outer peripheral seal 90. When the fire hydrant valve 22 is configured in the closed configuration as shown in FIG. 3, both seals 88, 90 prevent water from the upstream section 25 of the fire hydrant conduit 20 to flow into the longitudinal passageways 50, 73 and/or towards the downstream section 27 of the fire hydrant conduit 20 between the fixed valve body 32 and the displaceable valve body 66. More particularly, the downstream seal 90 prevents water from flowing between the fixed valve body 32 and the displaceable valve body 66, above (downstream) the upstream ports 52, while the upstream outer peripheral seal 88 prevents water from flowing between the fixed valve body 32 and the displaceable valve body 66, below (upstream) the upstream ports 52. In other words, when fire hydrant valve 22 is configured in the closed configuration, the downstream seal 90 and the upstream seal 88 respectively abut against the peripheral inner face 46 of the peripheral wall 40 of the fixed valve body 32 above (downstream) and below (upstream) the upstream ports 52. When the fire hydrant valve 22 is in the fully open configuration as shown in FIG. 2, the seals 88, 90 prevent water from flowing between the fixed valve body 32 and the displaceable valve body 66, thereby directing water into the longitudinal passageway 73 from the upstream ports 52 to the downstream port 54. Thus, in an embodiment, in the fully open configuration, both the downstream seal 90 and the upstream seal 88 respectively abut against the peripheral inner face 46 of the peripheral wall 40 of the fixed valve body 32 above (downstream) the upstream ports 52. In another embodiment wherein the upstream ports 52 are not entirely uncovered in the fully open configuration, only the downstream seal 90 abuts against the peripheral inner face 46 of the peripheral wall 40 of the fixed valve body 32 above (downstream) the upstream ports 52 while sections of the upstream seal 88 are exposed (aligned with) the upstream ports 52.

Similarly as for the seals 88, 90, an inner peripheral seal 91 is mounted to the peripheral inner face 46 of the peripheral wall 40 of the fixed valve body 32 to ensure a watertight connection between the peripheral inner face 46 of the fixed valve body 32 and the peripheral outer face 71 of the displaceable valve body 66. When the fire hydrant valve 22 is in one of the plurality of open configurations, the inner peripheral seal 91 ensures a watertight connection between a pressurized zone, i.e. a zone defined by the longitudinal passageways 50, 73, and a drainage zone, i.e. a zone at about normal atmospheric pressure out of the longitudinal passageways 50, 73 between the upstream outer peripheral seal 84 and the downstream outer peripheral seal 86. Thus, when the downstream outer peripheral seal 90 is displaced above (downstream) the drainage aperture 92, when the fire hydrant valve 22 is configured from the closed configuration to one of the plurality of open configurations, fluid communication of water under pressure is prevented from the pressurized zone to the drainage zone by the inner peripheral seal 91 abutting the peripheral outer face 71 of the displaceable valve body 66.

In the embodiment shown, the seals 84, 86, 88, 90, 91 are inserted in recesses defined in the respective one of the peripheral walls 40, 68. However, in an alternative embodiment, they can be mounted directly to the respective one of the peripheral walls 40, 68.

Figure 5:
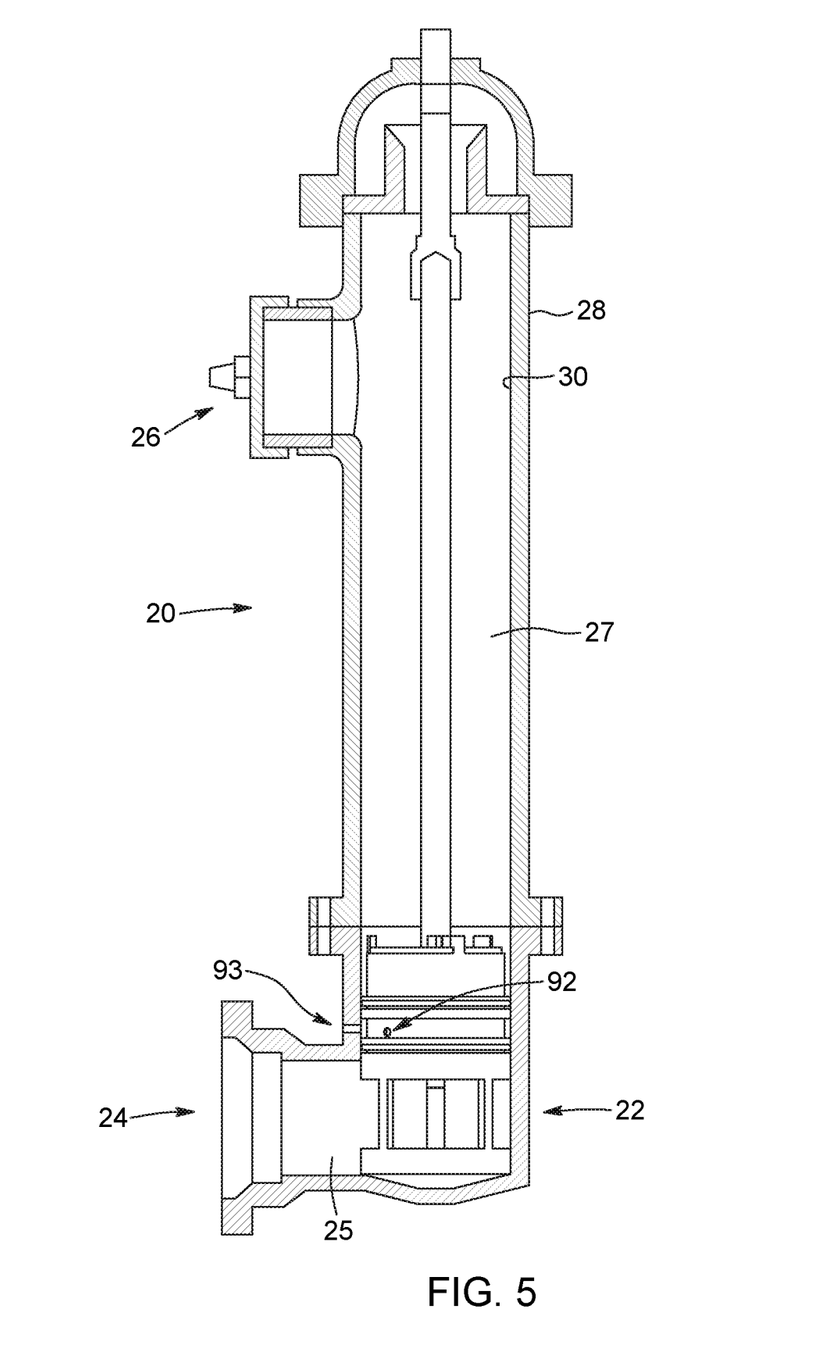
FIG. 5 is a perspective view of the fire hydrant valve shown in FIG. 1 wherein the fire hydrant valve is inserted in a fire hydrant conduit.

Referring to FIG. 5, there is shown the fire hydrant valve 22 inserted in the fire hydrant conduit 20, in accordance with an embodiment. As it is known in the art, the fire hydrant conduit 20 transports a water flow from a water flow inlet 24 to a water flow outlet 26. In the embodiment shown, the water flow inlet 24 and the water flow outlet 26 correspond respectively to an aqueduct conduit and a pumper nozzle. In the embodiment shown, the fire hydrant conduit 20 comprises the conduit peripheral wall 28 including the inner face 30. A drainage aperture 93, close to the drainage aperture 92 of the fire hydrant valve 22, is defined in the conduit peripheral wall 28. Thus, in the closed configuration of the fire hydrant valve 22, excess water contained in the longitudinal passageways 50, 73, i.e. water exceeding the drainage aperture 93, is then evacuated out of the fire hydrant conduit 20 through the drainage aperture 93. The fire hydrant valve 22 is removably insertable into the fire hydrant conduit 20, wherein the fire hydrant valve 22 is substantially contiguous and almost abuts the inner face 30 such as to control the water flow in the fire hydrant conduit 20. As mentioned above, the seals 84 and 86, mounted to the fixed valve body 32 of the fire hydrant valve 22, ensure the watertight junction between the inner face 30 and the peripheral outer face 48 of the fire hydrant valve 22 and thus prevent fluid communication therebetween.

As mentioned above, the fire hydrant valve 22 can be operated to control the water flow in the fire hydrant conduit 20. In normal operation, the fire hydrant valve 22 is maintained in the closed configuration wherein the upstream ports 52 are closed and occluded by the peripheral wall 68 of the displaceable valve body 66. When the fire hydrant valve 22 is in the closed configuration, water contained within the fire hydrant conduit 20, upstream the fire hydrant valve 22, exerts a substantially uniformly distributed pressure on the peripheral outer face 71 of the displaceable valve body 66.

To supply water from a fire hydrant including the fire hydrant conduit 20, the shaft 78 of the valve actuator assembly 76 is engaged into rotation to linearly displace the displaceable valve body 66 into the longitudinal passageway 50 of the fixed valve body 32 from the closed configuration to the at least one open configuration, thereby gradually opening at least one of the upstream ports 52 and allowing water to flow into the longitudinal passageways 50, 73 from at least one of the upstream ports 52. During its linear displacement inside the passageway 50, the displaceable valve body 66 is prevented from rotating due to friction-induced forces of the upstream outer peripheral seal 88 and the downstream outer peripheral seal 90 against the peripheral inner face 46 of the fixed valve body 32 and the inner peripheral seal 91 against the peripheral wall 68 of the displaceable valve body 66.

Thus, water is allowed to flow from the upstream section 25 to the downstream section 27 of the fire hydrant conduit 20. As mentioned above, the actuator support 80 of the displaceable valve body 66 is operatively engaged with the shaft 78 of the valve actuator assembly 76. By rotating the shaft 78 in a first rotation direction, the displaceable valve body 66 is displaced upwardly with respect to the fixed valve body 32, thereby exposing and opening at least partially the upstream ports 52 and allowing water to flow into the longitudinal passageways 50, 73 from the upstream ports 52 to the downstream port 54. In the open configurations, water flows from the water flow inlet 24 to the water flow outlet 26 of the fire hydrant conduit 20 and into the longitudinal passageways 50, 73 of the fire hydrant valve 22 between the upstream ports 52 and the downstream port 54. To shut down the fire hydrant, the shaft 78 is rotated in a second rotation direction, opposed to the first rotation direction, and, simultaneously, the displaceable valve body 66 is displaced downwardly, i.e. towards the upstream end wall 44, and progressively occludes the upstream ports 52, thereby preventing water from flowing into the longitudinal passageways 50, 73.

In an embodiment, the displaceable valve body 66 can be actuated by an operating nut, operatively connected to an operating stem extending upwardly from the shaft 78 to a head of the fire hydrant conduit 20, wherein the operating nut is manually rotated with a tool (as it is known in the art) to linearly displace the displaceable valve body 66 with respect to the fixed valve body 32 into the longitudinal passageway 50. In an alternative embodiment, the operating stem (and thus the shaft 78) can be remotely engaged into rotation upon receiving instructions from a controller operatively connected to the fire hydrant valve 22. In such embodiment, the operating stem (or the shaft 78) can be operatively connected to a motor to be engaged into rotation.

In the embodiment shown, only water exerts a force perpendicularly on the peripheral inner face 72 of the peripheral wall 68 of the displaceable valve body 66 of the fire hydrant valve 22 when water is flowing into the valve 22 through the upstream ports 52 when the valve is in one of the open configurations in contrast with prior art and present-day fire hydrant valves. Thus, water hammer phenomena are substantially inexistent with the operation of the fire hydrant valve 22. Indeed, water pressure does not exert force on the linear displacement of the displaceable valve body 66. However, the flow of water induces a substantially small opening force on the displaceable valve body 66. A sudden closing of the fire hydrant valve 22 caused by water pressure or by the flow of water is also prevented.

It will be appreciated that the methods described herein may be performed in the described order, or in any suitable order.

As mentioned above, even though the valve has been described with respect to a fire hydrant valve application, it is appreciated that the flow control valve can be used in other suitable applications and mounted inside liquid conduit to control a liquid flow therein.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A fire hydrant valve insertable in a fire hydrant conduit defined by a conduit peripheral wall, the fire hydrant valve comprising:
    a fixed valve body having a peripheral wall and defining a longitudinal passageway with a downstream end, and having at least one upstream port and a downstream port in fluid communication with the longitudinal passageway, the longitudinal passageway being opened at the downstream end with the downstream port being located at the downstream end of the longitudinal passageway;
    a displaceable valve body having a peripheral wall and defining a longitudinal passageway with a downstream end and being inserted into the longitudinal passageway of the fixed valve body and being linearly displaceable into the longitudinal passageway of the fixed valve body between a closed configuration, preventing water from flowing into the longitudinal passageways through the at least one upstream port, and at least one open configuration allowing water to flow into the longitudinal passageways through the at least one upstream port and towards the downstream ends of the longitudinal passageways of the fixed valve body and the displaceable valve body, wherein the downstream port is open in the closed configuration and the at least one open configuration; and
    a valve actuator assembly operatively engageable with the displaceable valve body, the valve actuator assembly being operable to linearly displace the displaceable valve body along the longitudinal passageway of the fixed valve body between the closed configuration and the at least one open configuration.

2. The fire hydrant valve as claimed in claim 1, wherein the at least one upstream port comprises a plurality of upstream ports uniformly distributed about the peripheral wall of the fixed valve body, each one of the upstream ports having substantially a same surface area.

3. The fire hydrant valve as claimed in claim 1, wherein the peripheral wall of the fixed valve body comprises an upstream edge and the fixed valve body comprises an upstream end wall extending from the upstream edge of the peripheral wall and closing the longitudinal passageway of the fixed valve body at an upstream end thereof, the at least one upstream port is adjacent to the upstream end wall.

4. The fire hydrant valve as claimed in claim 3, wherein the fire hydrant valve is configurable in a fully open configuration wherein the upstream edge of the peripheral wall of the displaceable valve body is located downstream of the upstream ports and, in the closed configuration, the upstream edge of the peripheral wall of the displaceable valve body is located upstream of the upstream ports.

5. The fire hydrant valve as claimed in claim 1, wherein the peripheral wall of the fixed valve body comprises a downstream edge defining the downstream port of the fixed valve body.

6. The fire hydrant valve as claimed in claim 1, wherein an inner perimeter of the fixed valve body substantially conforms to an outer perimeter of the displaceable valve body.

7. The fire hydrant valve as claimed in claim 1, wherein the valve actuator assembly comprises a linear actuator with a rotatable shaft including a threaded section and extending into the longitudinal passageways with an upstream end secured to an upstream end wall of the fixed valve body.

8. The fire hydrant valve as claimed in claim 1, wherein the peripheral wall of the fixed valve body comprises a drainage aperture extending therethrough and the fixed valve body further comprises an upstream outer peripheral seal secured to and circumscribing the peripheral wall upstream the drainage aperture and a downstream outer peripheral seal secured to and circumscribing the peripheral wall of the fixed valve body, downstream the drainage aperture, wherein the drainage aperture is uncovered by the peripheral wall of the displaceable valve body in the closed configuration.

9. The fire hydrant valve as claimed in claim 8, wherein the peripheral wall of the fixed valve body comprises a peripheral inner face and the fixed valve body comprises an inner peripheral seal mounted to the peripheral inner face of the fixed valve body, below the drainage aperture and downstream the at least one upstream port, the inner peripheral seal circumscribing the peripheral wall.

10. The fire hydrant valve as claimed in claim 1, wherein the displaceable valve body comprises an upstream outer peripheral seal and a downstream outer peripheral seal secured to and circumscribing the peripheral wall, wherein when the fire hydrant valve is configured in a closed configuration, the upstream outer peripheral seal extends upstream the at least one upstream port and the downstream outer peripheral seal extends downstream the at least one upstream port.

11. The fire hydrant valve as claimed in claim 1, wherein the fixed valve body is mountable inside the fire hydrant conduit and abuts against the conduit peripheral wall in a single configuration.

12. A method for controlling a water flow in the fire hydrant conduit in which the fire hydrant valve as claimed in claim 1 is mounted, the method comprising:
    maintaining the fire hydrant valve in the closed configuration by aligning the peripheral wall of the displaceable valve body therewith to close the at least one upstream port; and
    actuating the actuator assembly to linearly displace the displaceable valve body into the longitudinal passageway of the fixed valve body from the closed configuration to the at least one open configuration, thereby exposing the at least one upstream port and allowing water to flow into the longitudinal passageways from the at least one upstream port to the downstream port.

13. A flow control valve insertable in a liquid conduit defined by a conduit peripheral wall, the valve comprising:

a fixed valve body having a peripheral wall and defining a longitudinal passageway with a downstream end, and having at least one upstream port and a downstream port in fluid communication with the longitudinal passageway, the longitudinal passageway being opened at the downstream end with the downstream port being located at the downstream end of the longitudinal passageway;

a displaceable valve body having a peripheral wall and defining a longitudinal passageway with a downstream end and being inserted into the longitudinal passageway of the fixed valve body and being linearly displaceable into the longitudinal passageway of the fixed valve body between a closed configuration, preventing water from flowing into the longitudinal passageways through the at least one upstream port, and at least one open configuration allowing water to flow into the longitudinal passageways through the at least one upstream port and towards the downstream ends of the longitudinal passageways of the fixed valve body and the displaceable valve body, wherein the downstream port is open in the closed configuration and the at least one open configuration; and a valve actuator assembly operatively engageable with the displaceable valve body, the valve actuator assembly being operable to linearly displace the displaceable valve body along the longitudinal passageway of the fixed valve body between the closed configuration and the at least one open configuration.

14. The flow control valve as claimed in claim 13, wherein the at least one upstream port comprises a plurality of upstream ports uniformly distributed about the peripheral wall of the fixed valve body, each one of the upstream ports having substantially a same surface area.

15. The flow control valve as claimed in claim 13, wherein the peripheral wall of the fixed valve body comprises an upstream edge and the fixed valve body comprises an upstream end wall extending from the upstream edge of the peripheral wall and closing the longitudinal passageway of the fixed valve body at an upstream end thereof, the at least one upstream port being adjacent to the upstream end wall.

16. The flow control valve as claimed in claim 15, wherein the flow control valve is configurable in a fully open configuration wherein the upstream edge of the peripheral wall of the displaceable valve body is located downstream of the upstream ports and, in the closed configuration, the upstream edge of the peripheral wall of the displaceable valve body is located upstream of the upstream ports.

17. The flow control valve as claimed in claim 13, wherein the peripheral wall of the fixed valve body comprises a downstream edge defining the downstream port of the fixed valve body.

18. The flow control valve as claimed in claim 13, wherein an inner perimeter of the fixed valve body substantially conforms to an outer perimeter of the displaceable valve body and the peripheral wall of the displaceable valve body is substantially annular and concentric with the peripheral wall of the fixed valve body.

19. The flow control valve as claimed in claim 13, wherein the valve actuator assembly comprises a linear actuator with a shaft including a threaded section and extending into the longitudinal passageways with an upstream end secured to an upstream end wall of the fixed valve body.

20. The flow control valve as claimed in claim 13, wherein the peripheral wall of the fixed valve body comprises a drainage aperture extending therethrough and the fixed valve body further comprises an upstream outer peripheral seal secured to and circumscribing the peripheral wall upstream the drainage aperture and a downstream outer peripheral seal secured to and circumscribing the peripheral wall of the fixed valve body, downstream the drainage aperture, wherein the drainage aperture is uncovered by the peripheral wall of the displaceable valve body in the closed configuration.

21. The flow control valve as claimed in claim 13, wherein the fixed valve body is mountable inside the liquid conduit and abuts against the conduit peripheral wall in a single configuration.

* * * * *